United States Patent
Fathollahi et al.

(10) Patent No.: US 9,473,192 B2
(45) Date of Patent: Oct. 18, 2016

(54) PROTECTIVE CASE FOR MOBILE DEVICE HAVING COVER WITH OPAQUE AND TRANSPARENT REGIONS

(71) Applicant: Incipio, LLC, Irvine, CA (US)

(72) Inventors: Andy Fathollahi, Corona del Mar, CA (US); Peter Tu, Long Beach, CA (US)

(73) Assignee: INCIPIO, LLC, Irvine, CA (US)

( * ) Notice: Subject to any disclaimer, the term of this patent is extended or adjusted under 35 U.S.C. 154(b) by 0 days.

(21) Appl. No.: 15/065,816

(22) Filed: Mar. 9, 2016

(65) Prior Publication Data

US 2016/0269069 A1    Sep. 15, 2016

Related U.S. Application Data

(60) Provisional application No. 62/131,185, filed on Mar. 10, 2015.

(51) Int. Cl.
| | |
|---|---|
| *H04B 1/38* | (2015.01) |
| *H04M 1/03* | (2006.01) |
| *H04M 1/02* | (2006.01) |
| *H04B 1/3888* | (2015.01) |

(52) U.S. Cl.
CPC .................................. *H04B 1/3888* (2013.01)

(58) Field of Classification Search
CPC ....... H04B 1/38; H04B 1/3888; H04M 1/02; H04M 1/026; H04M 1/03
USPC ........................ 455/90.3, 128, 575.1, 575.8
See application file for complete search history.

(56) References Cited

U.S. PATENT DOCUMENTS

| | | | | |
|---|---|---|---|---|
| 5,657,210 | A * | 8/1997 | Yamanaka | G08B 3/1058 340/7.63 |
| 6,445,577 | B1 * | 9/2002 | Madsen | G06F 1/1628 206/320 |
| 8,599,547 | B2 * | 12/2013 | Richardson | G06F 1/1626 345/173 |
| 9,246,532 | B2 * | 1/2016 | Agnes Desodt | H04B 1/3888 |
| 9,276,628 | B1 * | 3/2016 | Zommer | H04B 1/3888 |
| 2013/0281169 | A1 * | 10/2013 | Coverstone | H04M 19/048 455/575.8 |

* cited by examiner

*Primary Examiner* — Blane Jackson
(74) *Attorney, Agent, or Firm* — Manatt, Phelps & Phillips, LLP

(57) ABSTRACT

A protective case for a mobile device is disclosed. The protective case includes a front cover and a back cover that is comprised of a shell, which together are configured to receive, retain, cover and protect the mobile device. The shell is configured to receive and retain the mobile device while providing user access to the mobile device. The shell has an outer surface configured to attach to a hinge member which in turn attaches to the front cover. The front cover includes an opaque main region that is configured to overlie the main touchscreen interface region and a generally curved and transparent side region that is configured to overlie a separate touchscreen interface region. When closed the cover is configured to allow for user interaction with the underlying covered screen. The user interaction may be via capacitive and/or mechanical pressure interaction with the touchscreen.

20 Claims, 5 Drawing Sheets

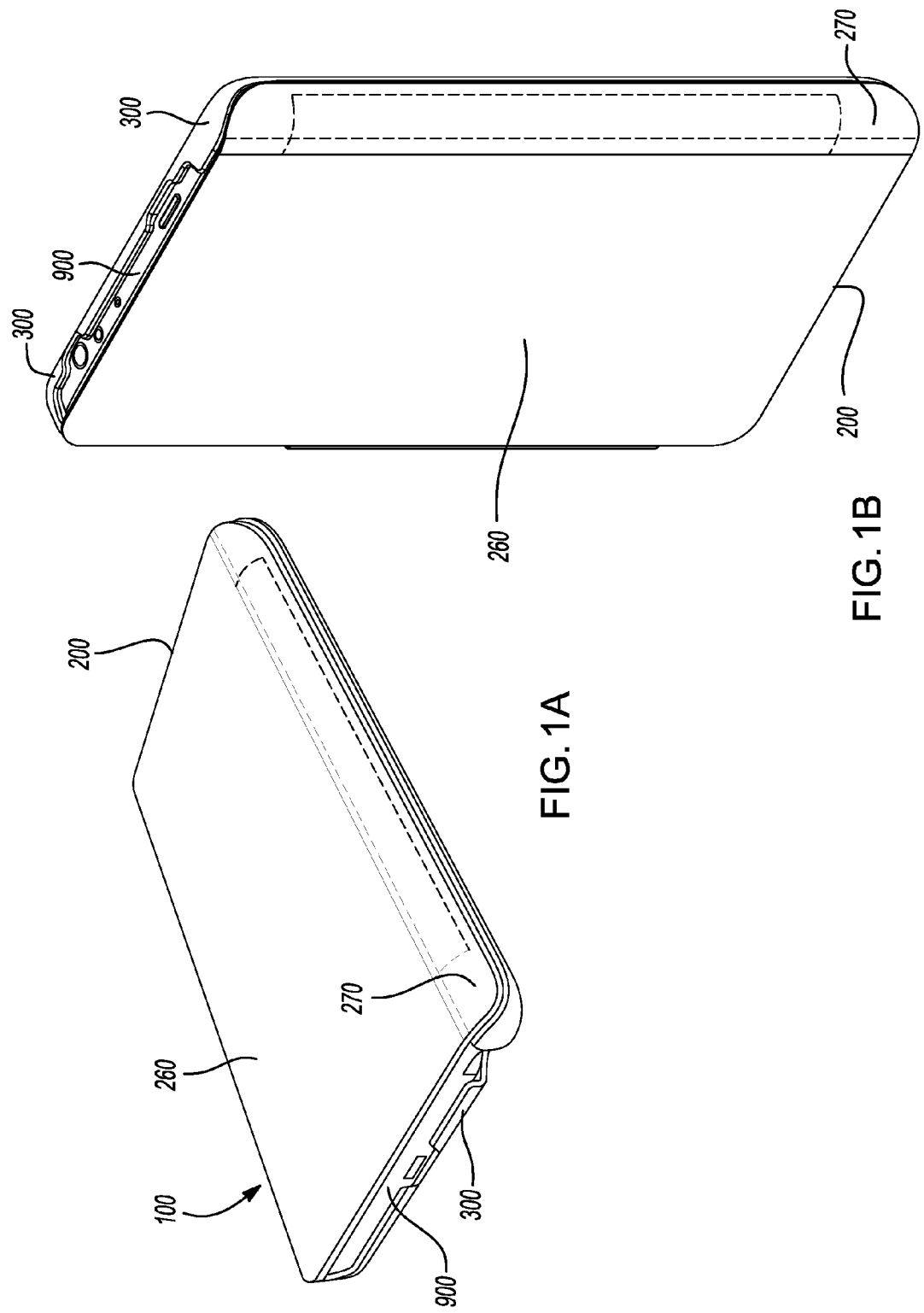

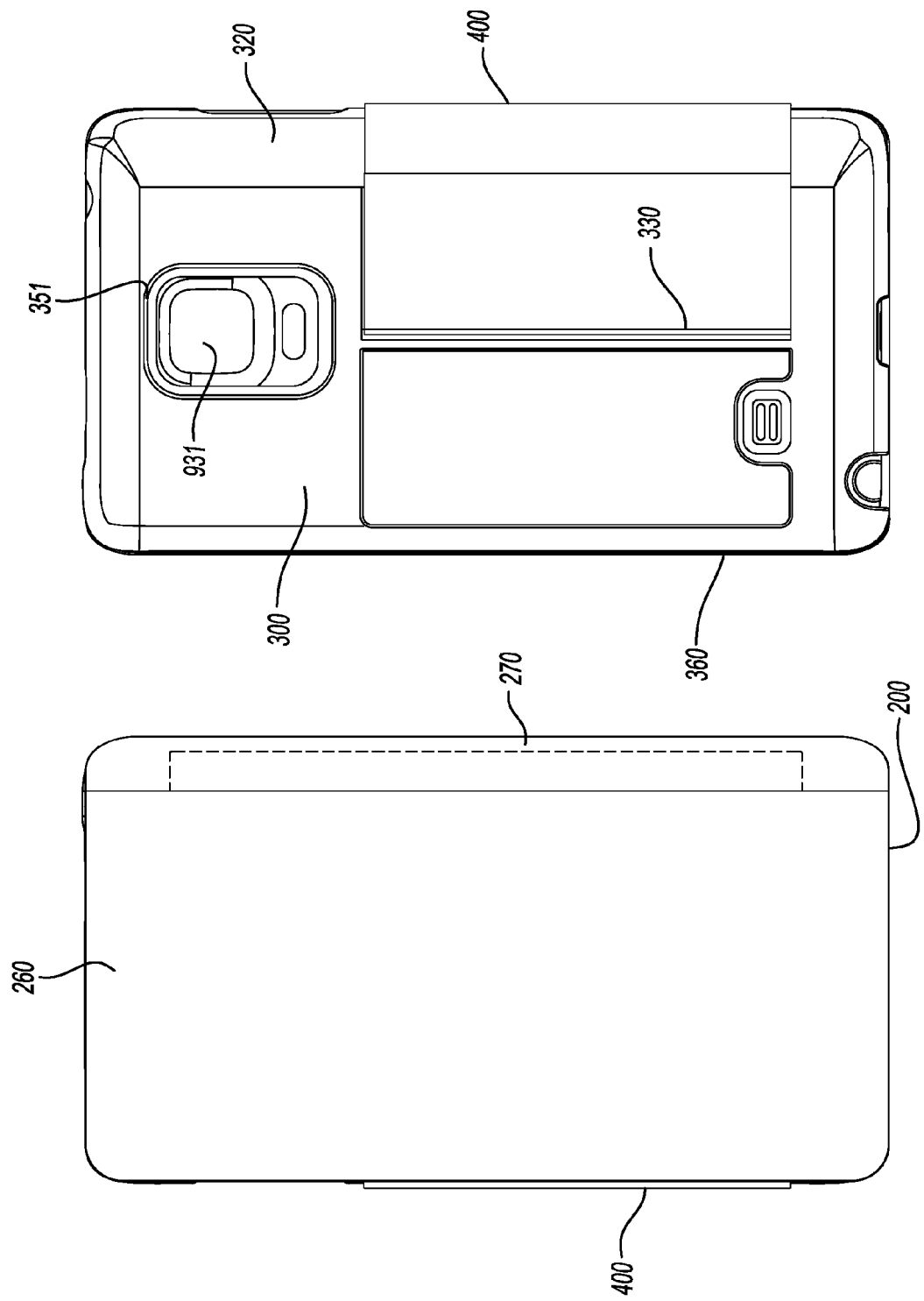

PROTECTIVE CASE FOR MOBILE DEVICE HAVING COVER WITH OPAQUE AND TRANSPARENT REGIONS

INCORPORATION BY REFERENCE TO RELATED APPLICATIONS

This application claims benefit of priority under 35 U.S.C. §119(e) from U.S. Provisional Application No. 62/131,185, filed on Mar. 10, 2015, which is hereby incorporated herein by reference in its entirety and is to be considered as a part of this specification.

BACKGROUND

1. Field of the Invention

This patent document relates to protective cases for mobile or handheld electronic devices such as tablet computers, smart phones, gaming devices and the like.

2. Description of the Related Art

Mobile devices (e.g. cellular and smart phones, tablet and laptop computers, MP3 players and various gaming devices, etc.) and protective cases for such mobile devices are known in the art. There is a continuing need, however, to improve the construction and usability of protective cases to complement new device features and technologies and thereby enhance user experience.

With the advent of multi-surface or display screens, such as the Samsung Galaxy Note Edge™ smart phone, and the continuing need for user privacy and battery conservation, the inventors here recognized that there is a need for protective cases capable of covering and protecting the display of the mobile device yet also allowing visibility into another screen on the mobile device or one or more discrete regions of the display while the screen or discrete region of the display remains covered.

SUMMARY

There exists a continuing need for new and improved designs for cases for mobile devices that can provide high levels of protection and usability.

Various aspects of a uniquely design protective case for a mobile device are disclosed. The protective case includes a front cover and a bottom cover, which together are configured to receive, retain, cover and protect the mobile device. The bottom cover includes a shell or compartment that is configured to reversibly receive and retain the mobile device, for which it is designed, while also providing user access to the screen and control buttons of the mobile device. The front cover is configured to overlie and protect the display or screen regions of the device.

In one aspect, the side wall of the shell on a first side is lower in height than the side wall of the shell on an opposing second side thereof. The bottom cover is hingedly attached to the front cover so as to allow user access to the screen and a support platform to the device when in the open position. The front cover includes a first opaque region and a second transparent region.

In one aspect, the first opaque region may be generally flat and extend along a first plane. In another aspect, the second transparent region may be curved and extend along a second plane that is different or transverse from the first plane.

The manner by which the relatively opaque and transparent regions are formed and the nature of the transition between those regions comprise yet other aspects.

While various aspects are described above and in connection with the embodiments of the protective cases disclosed herein, including the drawings and claims, it should be understood that any of those aspects may be combined to form claims for a device, apparatus, system, methods of manufacture and/or use in any way without limitation.

BRIEF DESCRIPTION OF THE DRAWINGS

FIG. 1A is a perspective view of a protective case in the fully closed position in accordance with the teachings herein. The protective case illustrated is configured for the Samsung Galaxy Note Edge™ smart phone, which is depicted as being housed therein.

FIG. 1B is another perspective view showing the front, right, and top regions of the protective case of FIG. 1 in the fully closed position.

FIGS. 2A-2F are front, rear, left, right, top and bottom views, respectively, of the protective case illustrated in FIGS. 1A-1B in the fully closed position.

DETAILED DESCRIPTION OF THE PREFERRED EMBODIMENT

Figure 2C:
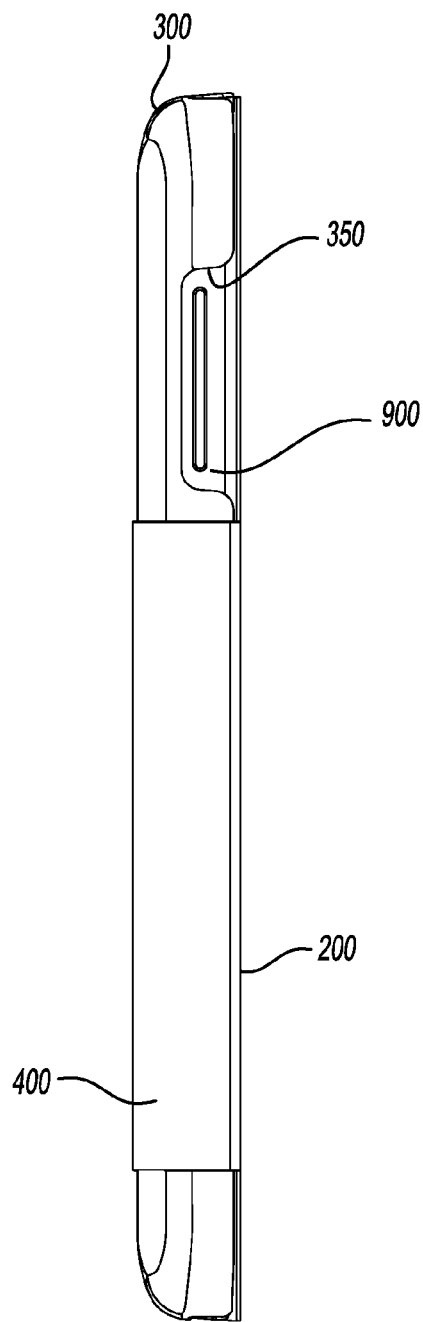
Figure 2D:
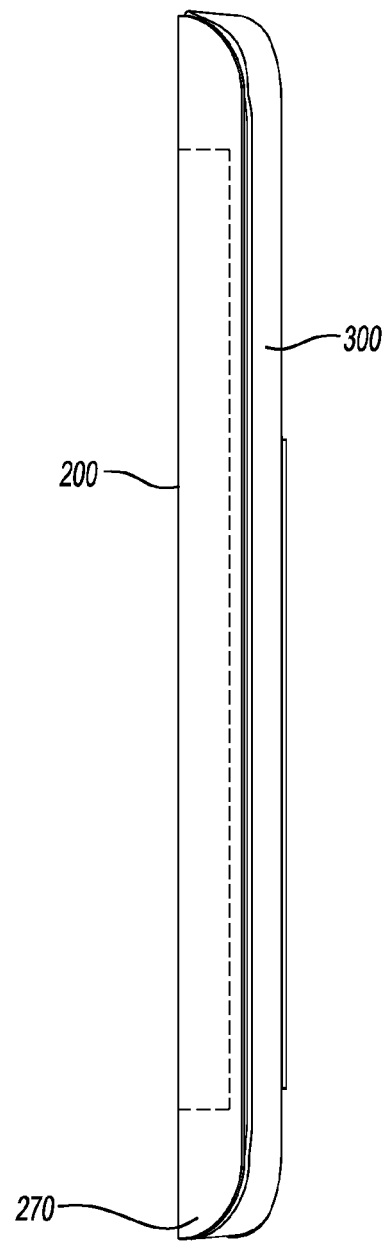
Figure 2E:
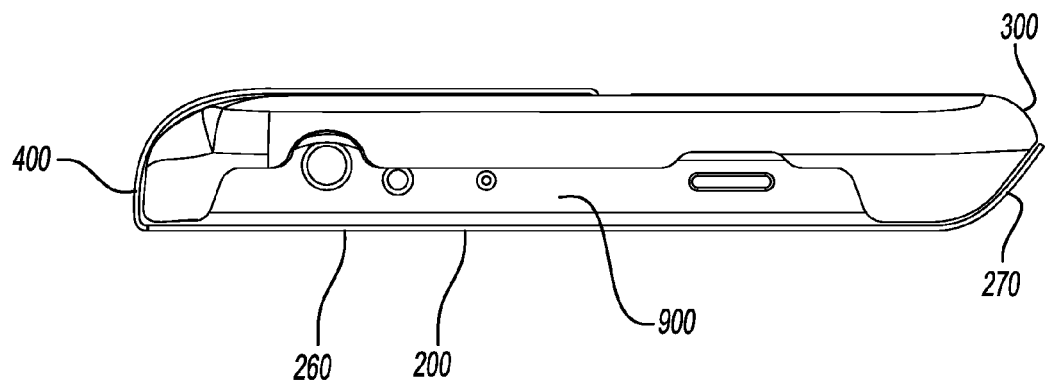
Figure 2F:
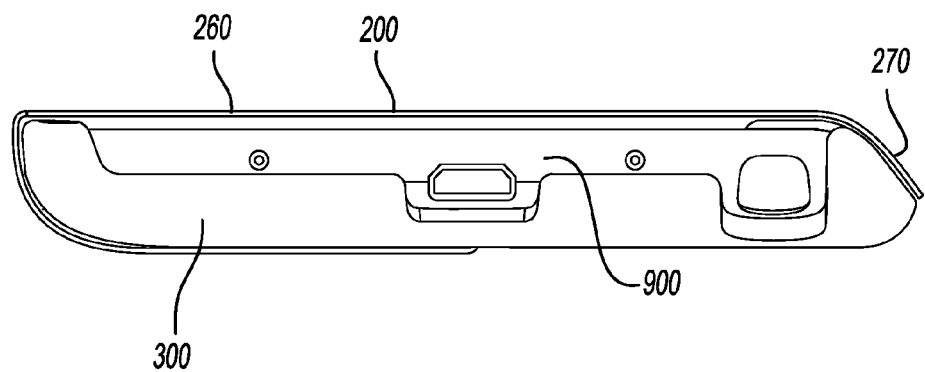

Features, aspects and advantages are described below with reference to the drawings, which are intended to illustrate but not to limit the invention. In the drawings, like reference characters denote corresponding features consistently throughout. FIGS. 1-4 illustrate various aspects of a single embodiment of the protective case for a mobile device 900 in the form of an Samsung Galaxy Note Edge Phone™. The phone 900 has a display that includes a curved interactive screen 920 that extends across the right side of the phone 900, which can be used as a sidebar 930 to display application shortcuts, notifications, and/or other information. It should be understood, however, that the various aspects and teachings herein are not limited to any particular mobile device, but rather have wide applicability.

Figure 3:
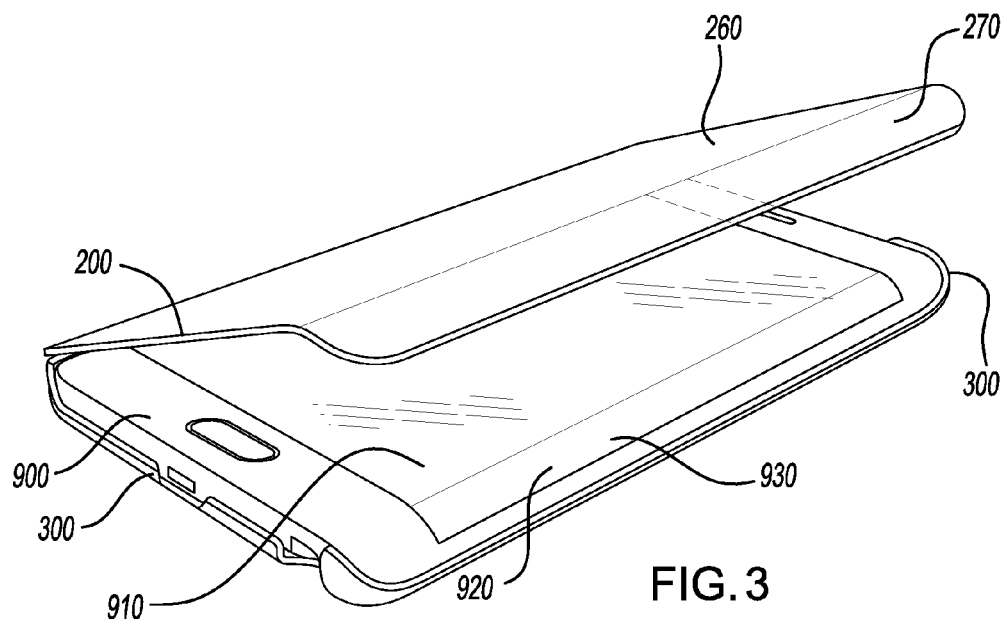
FIG. 3 is a perspective view of the protective case of FIG. 1A, wherein the front cover of the protective case is partially open to further illustrate the configuration and constriction of the constituent components and their operation.
Figure 4:
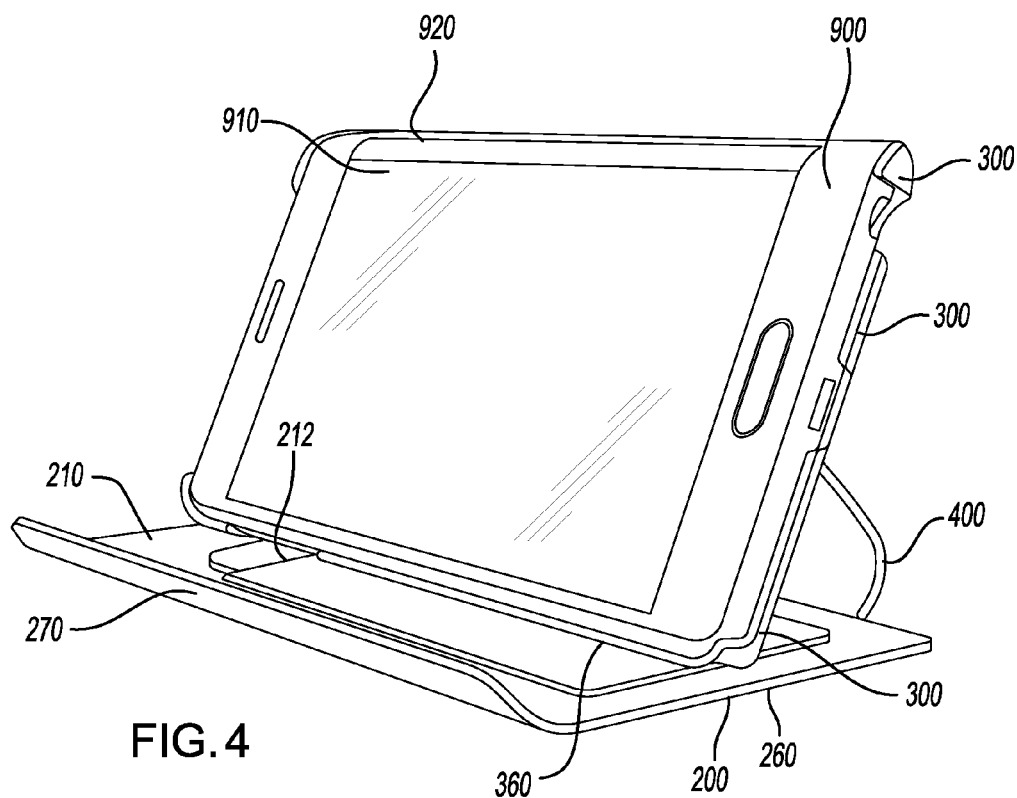
FIG. 4 is a perspective view of the protective case of FIG. 1A, wherein the protective case is in an operating/viewing position.

As illustrated in FIGS. 1-4, the protective case 100 includes a front cover component 200 hingedly attached via a panel 400 that is connected to a back cover or shell component 300. Together, the front and back covers are configured to receive, retain, cover and protect the mobile device 900, while providing access to the user interfaces of the mobile device and support to position the device on edge, as illustrated in FIG. 4.

As best illustrated in FIGS. 3-4, the phone 900 includes a display 910 that includes a primary flat screen that extends along a horizontal plane and a side region or screen 920 that is curved or begins to curve at or near its intersection with the primary screen and extends along a transverse plane to form the right side of the phone 900. The side region 920 may function to display notifications and/or specific tool bars 930 that the user can interface with discretely from other regions of the display (e.g., the primary flat screen region 910).

The shell component 300 is configured to reversibly receive and retain the phone or mobile device while providing user access via apertures 350 to the various control buttons (e.g., power, volume etc.), ports (e.g., headphone jacks, data and charging ports, etc.). As illustrated camera aperture 351 is also provided in the case that extends through the shell 300 to allow functionality of the camera 931.

The shell component 300 has an inner side or surface 310 configured to face the phone 900 and receive and retain the phone 900, and a generally opposing outer side or surface 320 that generally faces away from the phone 900.

The wall portion of the shell component 300 may include an attachment joint or slot 330 on the outer surface that mechanically and/or adhesively attaches the hinged panel 400 to the back cover 300.

In the present embodiment, the shell component 300 is made of rigid Plextonium™ polycarbonate. It should be understood, however, that any suitable material that is capable of being configured to receive and retain the mobile device 900 (preferably reversibly) may be employed including other plastics and/or fiber reinforced plastics (e.g., carbon, Kevlar, nylon, etc.), aluminum, wood, synthetic and/or natural leathers and fabrics with and without reinforcement or any combination thereof.

The front cover 200 is configured to generally correspond in shape with the outer surface of the screen or display 910, 920 of the mobile device 900 and in the particular illustrated embodiment has a generally flat or planar main region 260 and a generally curved side region 270 that extends generally traverse to the main region 260. When the case 100 is in the closed position as shown in FIGS. 1A-2F, the case 200 provides protection to not only the back, sides and main region of the screen 910, but also covers and protects the side portion of the display 920 that wraps around and extends down the right side of the device 900.

Generally, the main region 260 is made of an opaque material while the side region 270 of the cover is made of a transparent material. In the illustrated embodiment, the front cover 200 may be made of durable faded and transparent Plextonium™ polycarbonate, with the main region 260 of the front cover 200 may be coated with an opaque material while the side region 270 is left transparent. The coating in the transition region between the opaque main region 260 and the transparent side region 270 may be abrupt or more gradual so the transition from the opaque to the more transparent region is visually gentler and less apparent. While polycarbonate has been found to be well suited, it should be understood that any suitable material may be employed.

It is also contemplated that the side region 270 of the cover 200 may be configured to allow for user interaction through the side region 270 of the cover directly with the underlying screen region 920 of mobile device 900 when the front cover 200 is in the fully closed position. Thus, the side region 270 of the front cover 200 may be made of thin sheet of rigid transparent plastic that is dimensioned to allow for sufficient capacitive interaction with the underlying touch screen display. For example, an injected molded polycarbonate with a thickness of less than 0.5 mm, with a preferred range of between 0.3 mm and 0.5 mm, in the side region 270 is capable of being suitable for such constructions. The thickness of the cover 200 may vary with, for example, the cover 200 may be thicker in the opaque region 260 and formed thinner in the side region 270 to facilitate user interaction with the underlying screen region.

It is also contemplated that the front cover 200 may include one or more latches on one or more sides, for example along the perimeter of the side region 270, that allow the front cover to snap or latch to the back cover or shell component 300 so as to bias the side region 270 into contact with the underlying screen region 920 to thereby facilitate capacitive and/or mechanical pressure communication by the user with the underlying screen directly through cover region 270. The regions 260 and 270 of the cover may be formed by the same or different materials and as a unitary construction (e.g., molded) or as separate pieces that are attached to one another.

FIG. 3 is a perspective view of the protective case of FIG. 1A, wherein the front cover 200 of the protective case 100 is partially open to further illustrate the configuration and construction of the constituent front and rear cover components 200 and 300 and their operation and the smart phone 900 housed therein.

FIG. 4 is a perspective view of the protective case of FIG. 1A, wherein the protective case 100 is in an operating/viewing position. When the case 200 is in the illustrated operating/viewing position, the hinged panel 400 supports the back of the shell component 300 to maintain the device 900 and shell 300 on edge in an angled use position. The longitudinal side 360 of the shell 300 rests on the inner surface 210 of the cover 200. The cover 200 also may include a slotted compartment 212 that is concealed underneath the opaque region 260 that allows for the storage of identification, credit cards, receipts and the like. Magnets and/or mechanical ridges or slots may be included on the inside panel surface 210 of the cover 200 to assist in maintaining the desired operating position.

The hinged panel 400 may be made of any suitable material that allows for desired relative rotation, described herein, of the front and back covers to provide access to the mobile device. In the illustrated embodiment, the hinged panel 400 is a living flexible hinge made of synthetic or vegan leather material (with or without a stiffening substrate) that is mechanically and/or adhesively attached to the front cover 200 and shell 300. Conventional rigid hinges such as those used to mount doors or other components to one another may also be used and may be attached to the side of the shell 300.

In operation, when the phone is received in the protective case 100 and the cover 200 is completely closed, a proximity sensor on the front face of the phone 900 may detect the presence of the opaque region of the front cover 200 and turn the display off in the main region to conserve power, yet the side region 920 of the touchscreen that is covered by the transparent region 270 of the cover 200 is capable of staying active and lit, thereby keeping the user informed of notifications and the like. The user may interact through the side region 270 of the cover directly with the underlying screen region 920 of mobile device 900 when the front cover 200 is in the fully closed position. Portions of the front cover including in the transparent and/or non-transparent regions may include apertures that facilitate user interface with the display screen.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case configured to reversibly receive and retain a mobile device, said mobile device comprising a back face, a planar front face, a touchscreen display extending from the planar front face to a longitudinally extending side wall that extends transverse to the planar front face, and one or more control buttons and ports on its perimeter walls, said protective case comprising:
    a back cover comprising a shell portion configured to reversibly receive and retain the mobile device while providing user access to the touchscreen and user access to one or more control buttons on the mobile device; and
    a front cover hingedly attached to said back cover, said front cover having a first region and a second region, the first region is flat and configured to extend over the planar front face of the mobile device, the second region is relatively more transparent than the first region and extends in a transverse direction as compared to the first region, said second region being configured to extend over the region of the touchscreen that forms the longitudinally extending side wall of the mobile device.

2. The protective case of claim 1, wherein the shell is made of molded polycarbonate panel that is configured to snap onto the mobile device and retain the mobile device therein.

3. The protective case of claim 1, wherein said front cover further including a transition region residing between the first and second region and wherein said transition region includes a curved region that is configured to conform with a curved region of the touchscreen display on the mobile device.

4. The protective case of claim 3, wherein said transition region is more opaque than said second region and more transparent than said first region of said front cover.

5. The protective case of claim 3, wherein the transparency of said transition region varies as it extends from said first region to said second region.

6. The protective case of claim 1, wherein said first and second regions of the front cover are molded as a unitary component.

7. The protective case of claim 1, wherein in operation, the shell component may be rotated and supported in a first operational stand position along a longitudinally extending side wall of said shell.

8. The protective case of claim 7, wherein said longitudinally extending side wall in said first operational stand position rests on an inner surface of said front cover.

9. The protective case of claim 1, wherein said front cover further includes an accessible compartment and an inner surface that faces said screen when said front cover is fully closed and wherein said inner surface includes a slotted access to said accessible compartment.

10. The protective case of claim 1, wherein said second region extends to said perimeter of said front cover.

11. The protective case of claim 1, wherein said first region is configured to cover a first proximity sensor in the mobile device when the front cover is completely closed.

12. The protective case of claim 11, wherein said second region is configured to cover a second proximity sensor in the mobile device when the front cover is completely closed.

13. The protective case of claim 1, wherein said front cover includes a latch that when connected to the back cover is capable of biasing the cover into contact with the touchscreen display of the mobile device.

14. The protective case of claim 1, wherein said second region is configured to allow capacitive interaction with the underlying touchscreen directly through the cover.

15. A protective case configured to reversibly receive and retain a mobile device, said mobile device having a back face, a planar front face, a touchscreen display extending from the planar front face to a longitudinally extending side wall that extends transverse to the planar front face, and one or more control buttons and ports on its perimeter walls, said protective case comprising:
    a back cover comprising a shell portion configured to reversibly receive and retain the mobile device while providing user access to the entire touchscreen and user access to one or more control buttons on the mobile device;
    a hinged panel attached to the back cover; and
    a front cover hingedly attached to the back cover via the hinged panel, the front cover having a first region configured to extend over the planar front face of the mobile device and a second region configured to extend in a transverse direction as compared to the first region, wherein the first region is flat and opaque, the second region is transparent.

16. The protective case of claim 15, wherein the second region is configured to extend over the region of the touchscreen that forms a longitudinally extending side wall of the mobile device.

17. The protective case of claim 15, wherein the second region includes a curved region that is configured to conform with a curved region of the touchscreen display on the mobile device.

18. The protective case of claim 17, wherein the second region is configured to allow capacitive interaction with the underlying touchscreen directly through the cover.

19. The protective case of claim 18, wherein the front cover is thicker in the first region and thinner in the second region.

20. The protective case of claim 15, wherein said hinged panel is flexible.

* * * * *